Oct. 14, 1924.
J. M. POPE
1,511,979
COMBINED CULTIVATOR AND BOLL WEEVIL EXTERMINATOR
Filed Sept. 4, 1923    2 Sheets-Sheet 1
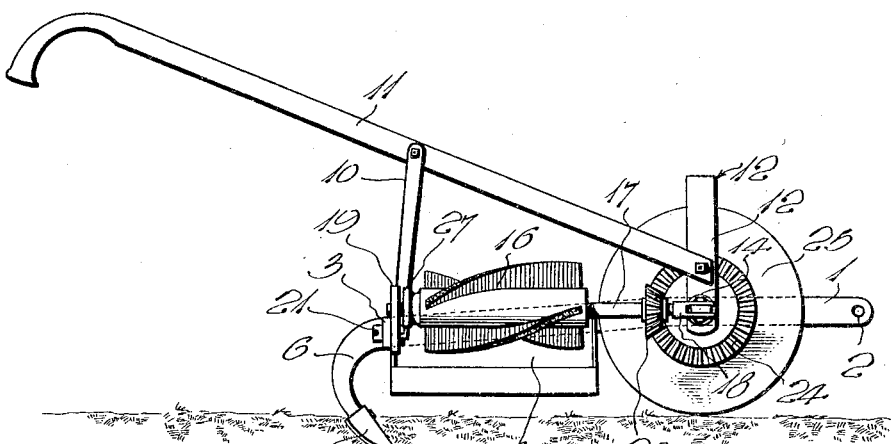
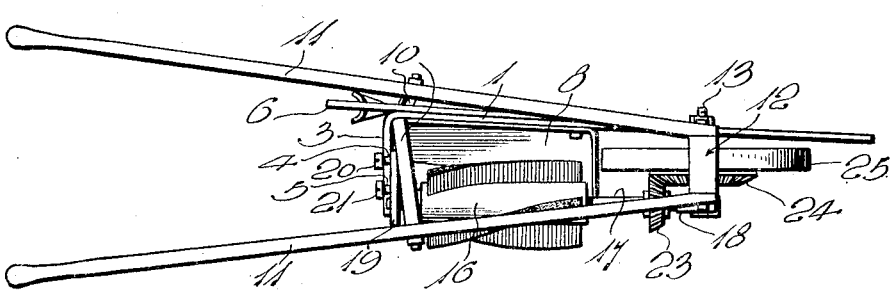
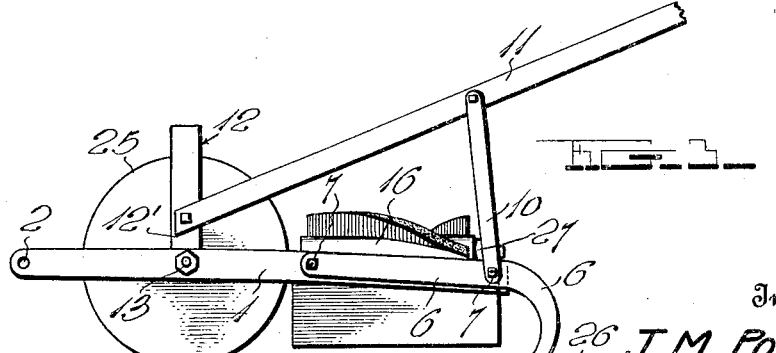
Inventor
J. M. POPE
Witness
H. Woodard
By H. R. Wilson & Co.
Attorneys

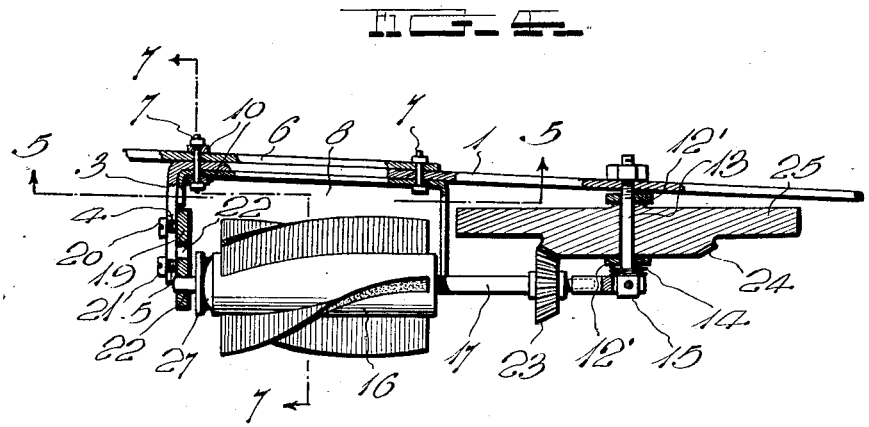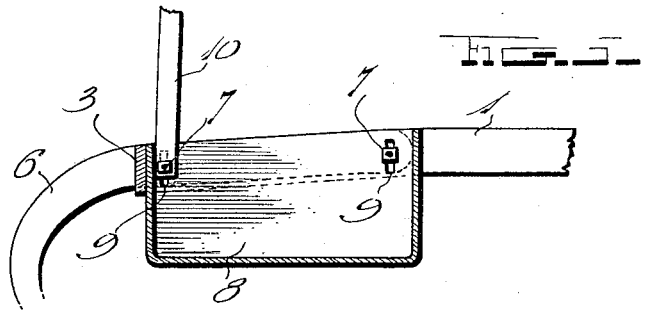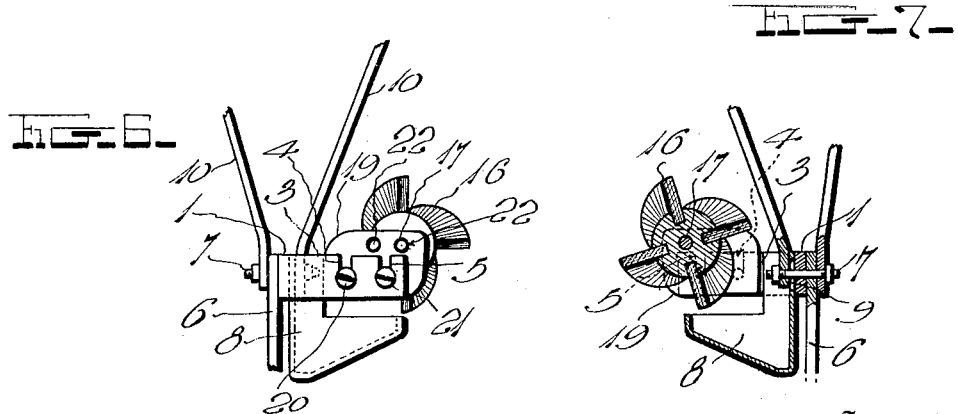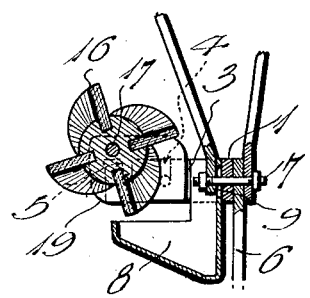

Patented Oct. 14, 1924.

1,511,979

UNITED STATES PATENT OFFICE.

JOHN M. POPE, OF NORMAN PARK, GEORGIA.

COMBINED CULTIVATOR AND BOLL-WEEVIL EXTERMINATOR.

Application filed September 4, 1923. Serial No. 660,872.

*To all whom it may concern:*

Be it known that I, JOHN M. POPE, a citizen of the United States, residing at Norman Park, in the county of Colquitt and State of Georgia, have invented certain new and useful Improvements in a Combined Cultivator and Boll-Weevil Exterminator; and I do declare the following to be a full, clear, and exact description of the invention, such as will enable others skilled in the art to which it appertains to make and use the same.

This invention relates to a combined cultivator and boll weevil destroying machine and one object of the invention is to provide a machine which can be used for cultivating the plants and at the same time destroy boll weevils which may be upon the plants, the weevil destroying means being so constructed that it can be adjusted to accommodate itself to the size and position of the plants and thus properly engage the plants to dislodge the boll weevils and cause them to drop into a pan having oil placed therein.

Another object of the invention is to provide an agricultural machine of the character described, in which the boll weevil destroying mechanism will be provided with an improved type of beater including a shaft rotatably mounted by bearings which permit of the shaft being vertically adjusted to the proper height and horizontally adjusted.

Another object of the invention is to so construct this machine that the bearings for one end of the beater shaft may be pivotally connected with the axle of the ground-engaging drive wheels and swung horizontally through its pivotal connection with this axle for adjustment transversely of the machine and swung vertically for vertical adjustment through turning of the axle in the ground-engaging wheel.

Another object of the invention is to so mount the axle that it may have sliding movement longitudinally of itself and be yieldably held against sliding movement in one direction so that the axle may be retained in the proper position for a gear carried by the brush-carrying shaft to have proper engagement with a gear at one side of the drive wheel.

Another object of the invention is to so construct this machine that if desired a pair of the machines may be operatively secured in transverse spaced relation and the two machines then drawn between two rows of plants and the weevil removed from the plants of the two rows at one time.

This invention is illustrated in the accompanying drawings, wherein:

Figure 1 is a view showing the improved machine in side elevation.

Figure 2 is a top plan view of the improved machine.

Figure 3 is a side elevation looking at the opposite side of the machine from that shown in Fig. 1.

Figure 4 is a longitudinal sectional view through the machine.

Figure 5 is a longitudinal sectional view taken along the line 5—5 of Fig. 4.

Figure 6 is a fragmentary view showing the structure disclosed in Fig. 4 in rear elevation.

Figure 7 is a transverse sectional view taken along the line 7—7 of Fig. 4.

This machine is provided with a frame having a longitudinally extending bar 1, the front end portion of which is provided with an opening 2 so that draft animals may be connected with this bar, which may be termed a draft-bar. The rear end portion of this bar 1 is bent to provide a side arm 3 having notches 4 and 5 cut from its upper edge. A shovel-carrier 6 is secured to the outer face of this bar 1 by bolts 7 which in addition to serving as securing means for the shovel-carrier 6, also serves as means for securing the oil pan 8 in place. From an inspection of Figs. 5 and 7, it will be seen that these bolts 7 pass through slots 9 formed in the vertical walls of this oil pan and that the oil pan can therefore be moved vertically to the desired position and then firmly secured. It will be further noted that the rear bolt 7 also serves as means for securing the braces 10 which extend upwardly in diverging relation and are secured to the handles 11 of the machine. The handles 11 are constructed after the manner of the ordinary plow handles and extend forwardly of the machine and have their forward ends secured to the depending arms 12' of the yoke 12. This yoke 12 extends transversely of the machine and carries an axle 13 which slidably passes through the lower end portions of the arms of the yoke and also passes through the bar 1 as shown in Fig. 4. Referring to this figure, it will be seen that the axle is only permitted of a slight sliding movement and is yieldably held against sliding movement in one direction by a spring 14 positioned between the flat head 15 at one end of the shaft and one of the arms of the yoke. In addition to the slight sliding movement, the axle is also permitted to have rotary movement for a purpose to be hereinafter brought out.

In order to remove the boll weevils from the plants, there has been provided a beater or brush 16 which extends longitudinally of the frame and is carried by a driven shaft 17. This shaft 17 extends longitudinally of the frame and has one end portion journaled in an elongated bearing 18 which is pivotally connected with the head 15 of the axle 13. By having this shaft rotatably mounted in the bearing 18, the shaft is permitted of swinging adjustment transversely of the machine and can thus be properly adjusted for engagement with the plants. At its rear end, the shaft is rotatably mounted by means of a bearing plate 19 which extends transversely of the machine and is pivotally mounted by means of a screw 20 positioned in the notch 4 of the side arm 3. A securing screw 21 is carried by this bearing plate and will be movable into and out of the notch 5. It will thus be seen that the plate can be swung vertically to an adjusted position and the screw 21 then tightened so that it will engage the rear face of the side arm 3 and securely hold the plate in the adjusted position. This plate has been provided with a plurality of openings 22 which are spaced from each other longitudinally of the bearing plate and transversely of the frame of the machine. The rear end of the shaft will be positioned in a selected opening or socket 22 and the shaft will thus be rotatably mounted. The shaft can therefore be adjusted transversely of the machine by placing its rear end in the desired socket 22 and can be vertically adjusted by swinging the bearing plate vertically and then securing it in the set position. The spring 14 will serve to yieldably hold the axle against sliding movement in one direction but permit of its having the necessary movement according to the horizontal adjustment of the shaft and permit the gear 23 to at all times have proper engagement with the gear 24 provided at one side of the ground-engaging wheel 25 loosely mounted upon the axle between the arms of the yoke.

When this machine is in use, it is to be drawn across a field between the rows of cotton plants and the shovel 26 carried by the shovel-carrier 6 will dig into the ground in the usual manner to break up the soil. The shaft 17 will be placed in the proper opening 22 so that the beater will extend beyond the side of the machine the necessary amount to permit of the beater engaging the plants and the bearing plate will be vertically adjusted to position this beater the proper distance above the ground according to the size of the plants. As the machine is drawn across the field, the rotary beater will engage the plants and will cause some of the boll weevils to be brushed off of the plants and others to be caused to drop off by the plants being agitated. These boll weevils will drop down into the oil pan 8 and will be killed by the oil in this pan. It will thus be seen that the ground between the rows of plants can be cultivated in a very effective manner and the boll weevils removed from the plants and destroyed at the same time.

If it is desired to remove the boll weevils from two rows at one time, instead of one row, a second machine can be provided which will be a duplicate of the one shown in the drawings except that the ground-engaging wheel 25, shaft 17, beater and associated parts will be positioned at the opposite side of the bar 1 from that shown in Fig. 4. The two machines will be placed in the proper spaced relation and will be secured in the spaced relation by cross bars which will be firmly secured to the bar 1 in any desired manner. While both of the machines will be provided with the ground-engaging wheels, it will only be necessary to have one of these constituting a power wheel and therefore the gear 23 of the second machine can be omitted and power can be transmitted from the beater of the first machine to the beater of the second machine by means of a belt engaged with pulley forming heads which will be provided at the rear ends of the beaters as shown at 27.

I claim:

1. An agricultural machine comprising a frame, an axle rotatably carried thereby, a wheel rotatable upon said axle, a driven shaft pivotally connected with said axle for horizontal swinging movement, the axle forming a pivot permitting vertical swinging movement of the shaft, a bearing for the other end of said shaft mounted for vertical adjustment and having shaft receiving sockets spaced transversely of said frame, and an operating element carried by said shaft.

2. An agricultural machine comprising a frame, an axle rotatably carried by said frame and slidable longitudinally of itself, a drive wheel loosely mounted upon said axle, a driven shaft, a bearing for one end of said shaft pivotally connected with one end of said axle for horizontal swinging movement, a gear carried by said shaft for engaging one side of said wheel, a bearing for the other end of said shaft mounted for vertical adjustment and having shaft receiving sockets spaced transversely of said frame, resilient means upon said axle engaging said first mentioned bearing to yieldably hold the axle against sliding movement in one direction, and an operating element carried by said shaft.

3. An agricultural machine comprising a frame, an axle rotatably carried by said frame, a drive wheel loose upon said axle, a driven shaft, a bearing for the forward end of said driven shaft pivotally connected with said axle for horizontal swinging movement, a gear carried by said shaft and having operative engagement with co-operating drive means at one side of said wheel, a beater carried by said shaft, a bearing for the rear end of said shaft pivotally connected with said frame for vertical swinging movement and having sockets for receiving the rear end of the shaft spaced transversely of the same, and means for releasably securing said bearing in a vertically adjusted position.

4. An agricultural machine comprising a frame including a longitudinally extending bar having a side arm, an axle rotatably carried by said frame, a drive wheel rotatably carried by said axle, a bearing pivotally connected with one end of said axle, a driven shaft having its forward end rotatably mounted in said bearing, said driven shaft being rotated from said wheel, a beater carried by said shaft, a bearing plate pivotally connected with the side arm of said bar and extending transversely of the frame and having sockets for receiving and rotatably mounting the rear end of said shaft, and a set-screw carried by said bearing plate and fitting into a vertically disposed cut-out in said side arm to releasably secure the bearing in a vertically adjusted position.

In testimony whereof I have hereunto affixed my signature.

JOHN M. POPE.